US007836089B2

(12) United States Patent
Ryman

(10) Patent No.: US 7,836,089 B2
(45) Date of Patent: Nov. 16, 2010

(54) DATA VIEW PRESERVATION

(75) Inventor: Arthur G. Ryman, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 11/936,831

(22) Filed: Nov. 8, 2007

(65) Prior Publication Data
US 2009/0125479 A1 May 14, 2009

(51) Int. Cl.
G06F 7/00 (2006.01)
G06F 17/30 (2006.01)
(52) U.S. Cl. .................. 707/796; 707/803; 707/804; 707/807
(58) Field of Classification Search .............. 707/2, 707/796
See application file for complete search history.

(56) References Cited

U.S. PATENT DOCUMENTS

| 6,012,093 | A | | 1/2000 | Maddalozzo, Jr. et al. |
| 6,098,106 | A | * | 8/2000 | Philyaw et al. ........... 709/238 |
| 6,195,679 | B1 | | 2/2001 | Bauersfeld et al. |
| 6,658,402 | B1 | | 12/2003 | Dutta |
| 6,826,553 | B1 | | 11/2004 | DaCosta et al. |
| 6,901,438 | B1 | | 5/2005 | Davis et al. |
| 6,948,118 | B2 | | 9/2005 | Genty et al. |
| 7,111,232 | B1 | * | 9/2006 | Bascom ..................... 715/209 |
| 2001/0042079 | A1 | * | 11/2001 | Urban ...................... 707/501.1 |
| 2002/0194081 | A1 | * | 12/2002 | Perkowski .................... 705/26 |
| 2004/0122971 | A1 | * | 6/2004 | Joshi et al. .................. 709/236 |
| 2004/0139143 | A1 | | 7/2004 | Canakapalli et al. |
| 2004/0243923 | A1 | * | 12/2004 | Nakamura .................. 715/500 |
| 2004/0260807 | A1 | | 12/2004 | Glommen et al. |
| 2006/0101284 | A1 | * | 5/2006 | Feuser et al. ................ 713/189 |
| 2006/0101384 | A1 | * | 5/2006 | Sim-Tang et al. ........... 717/104 |

OTHER PUBLICATIONS

Gandhi et al., "Domain Name Based Visualization of Web Histories in a Zoomable User Interface," Sep. 2000, pp. 591-598, Database and Expert Systems Application, Proceedings of the 11$^{th}$ International Workshop.
Nakajima et al., "Context-Dependent Web Bookmarks and Their Usage as Queries," Dec. 2002, 9 pages, Web Information Systems Engineering, Proceedings of the 3$^{rd}$ International Conference on Web Information Systems Engineering (WISE '02).

(Continued)

Primary Examiner—Hung T Vy
Assistant Examiner—Binh V Ho
(74) Attorney, Agent, or Firm—Daniel McLoughlin; Hoffman Warnick LLC

(57) ABSTRACT

The invention provides a method, system, and program product for preserving data views in an information space. A first aspect of the invention provides a method of preserving data views encountered as a user browses an information space, the method comprising: creating an empty path to be taken by a user through an information space assigning a uniform resource locator (URL) to the path; presenting a data view of the information space; assigning a URL to the data view; and adding the data view to the path. A path may contain one or more data views or, when created, no data views.

16 Claims, 5 Drawing Sheets

OTHER PUBLICATIONS

Milic-Frayling et al., "WebScout: Support for Revisitation of Web Pages Within a Navigation Session," Oct. 2003, 5 pages, Proceedings of the IEEE/WIC International Conference on Web Intelligence (WI '03).

Brank et al., "Predictive Algorithms for Browser Support of Habitual User Activities on the Web," Sep. 2005, 7 pages, Proceedings of the 2005 IEEE/WIC/ACM International Conference on Web Intelligence (WI '05).

Hurley et al., "File Migration and File Replication: A Symbiotic Relationship," Jun. 1996, pp. 578-586, IEE Transactions on Parallel and Distributed Systems, vol. 7, No. 6.

* cited by examiner

DATA VIEW PRESERVATION

TECHNICAL FIELD

The invention relates generally to the preservation of data and, more particularly, to the preservation of data views encountered by a user as a user navigates an information space.

BACKGROUND OF THE INVENTION

There are many circumstances in which a user must explore vast quantities of data. In business intelligence applications, this may be done in order to diagnose a problem, understand a cause and effect, or discover trends. Often, such tasks utilize query and reporting tools to search a data warehouse, which permit a user to drill down and examine data that is presented in tabular and/or graphical formats. In effect, a user is exploring an information space in much the same way that an Internet user explores the Web. In fact, the user interface for exploring an information space is often a Web browser.

Sharing a user's observations in exploring an information space (e.g., data warehouse, Web site etc.) may be just as important as the user's initial exploration of the information space, but is often more difficult. Some approaches require a user to bookmark a location of a data view using the Web browser's own bookmarking utility. However, there may not be a uniform resource locator (URL) associated with the data shown in the Web browser. In other cases, a URL itself may not change, even though the Web browser's content has changed. The latter may occur where the contents of a Web page are built up incrementally or where the contents of the Web page itself has changed since the page was bookmarked by a user.

Other approaches to sharing data views include taking screenshots of each data view. However, users with whom such screenshots are shared are not able to examine or manipulate the data themselves and cannot rerun query results to obtain a current state of the database.

Accordingly, there exists a need in the art to overcome the deficiencies and limitations described hereinabove.

SUMMARY OF THE INVENTION

The invention provides a method, system, and program product for preserving data views in an information space.

A first aspect of the invention provides a method of preserving data views encountered as a user browses an information space, the method comprising: creating an empty path to be taken by a user through an information space assigning a uniform resource locator (URL) to the path; presenting a data view of the information space; assigning a URL to the data view; and adding the data view to the path.

A second aspect of the invention provides a system for preserving data views encountered as a user browses an information space, the system comprising: a system for creating an empty path to be taken by a user through an information space; a system for assigning a uniform resource locator (URL) to the path; a system for presenting a data view of the information space; a system for assigning a URL to the data view; and a system for adding the data view to the path.

A third aspect of the invention provides a program product stored on a computer-readable medium, which when executed, preserves data views encountered as a user browses an information space, the program product comprising: program code for creating an empty path to be taken by a user through an information space; program code for assigning a uniform resource locator (URL) to the path; program code for presenting a data view of the information space; program code for assigning a URL to the data view; and program code for adding the data view to the path.

A fourth aspect of the invention provides a method for deploying an application for preserving data views encountered as a user browses an information space, comprising: providing a computer infrastructure being operable to: create an empty path to be taken by a user through an information space; assign a uniform resource locator (URL) to the path; present a data view of the information space; assign a URL to the data view; and add the data view to the path.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

The present invention involves a waypoint subsystem that can be integrated into a business intelligence application or any other application useful in navigating an information space. The waypoint subsystem of the invention allows a user to capture a sequence of data views encountered as the user explores or otherwise navigates through an information space. The sequence of captured data views defines a path through the information space. Captured data views may be stored and, optionally, shared with other users.

Waypoints according to the present invention include a query, a query result set, query parameters, database connection parameters, a uniform resource locator (URL) of the result set viewer, view parameters, and, optionally, a timestamp and/or user-provided descriptive parameters. Each waypoint, as well as the path as a whole, is assigned a URL and stored persistently in a database that is accessible via the Internet and/or an intranet. These URLs can be bookmarked, pasted into a document or email, or otherwise stored or shared with other users. As such, a user (whether the user who generated the waypoints or a user with whom the waypoints and/or path has been shared) may view, manage, and regenerate the query result sets of waypoints and paths. Access to the waypoints and the path is controlled by a waypoint service in order to enforce any data access restrictions on the query results.

Figure 1:
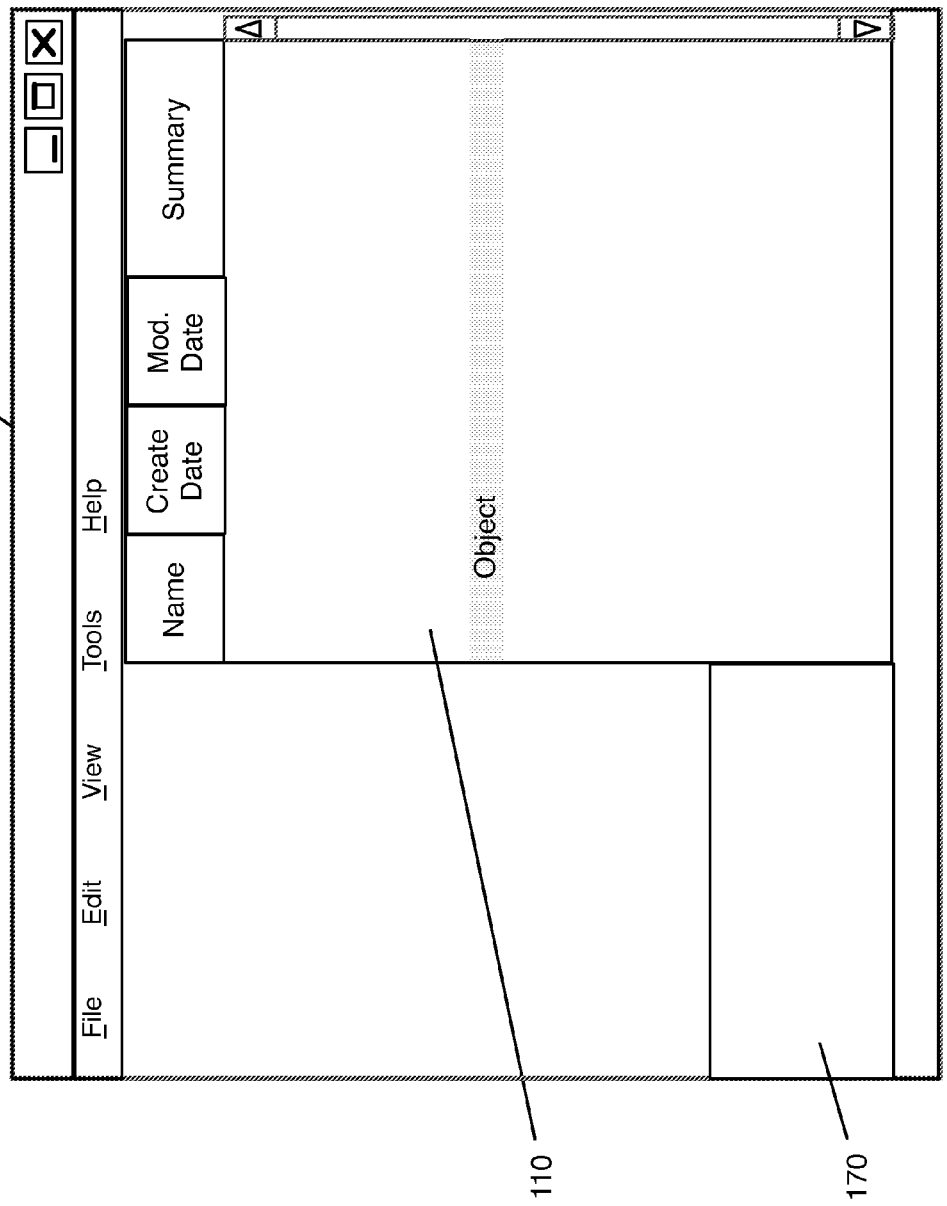
FIGS. 1-3 show the creation and transfer of a path and waypoints for data views according to an embodiment of the invention.

For example, referring now to the drawings, FIG. 1 shows a graphical user interface (GUI) 100 showing a data view 110 of an information space. GUI 100 includes a waypoint field 170, to which URLs or other descriptors of waypoints and paths may be added. Initially, waypoint field 170 does not contain any waypoints. Rather, a URL is assigned to the path itself, with individual waypoints added to the path later.

Figure 2:
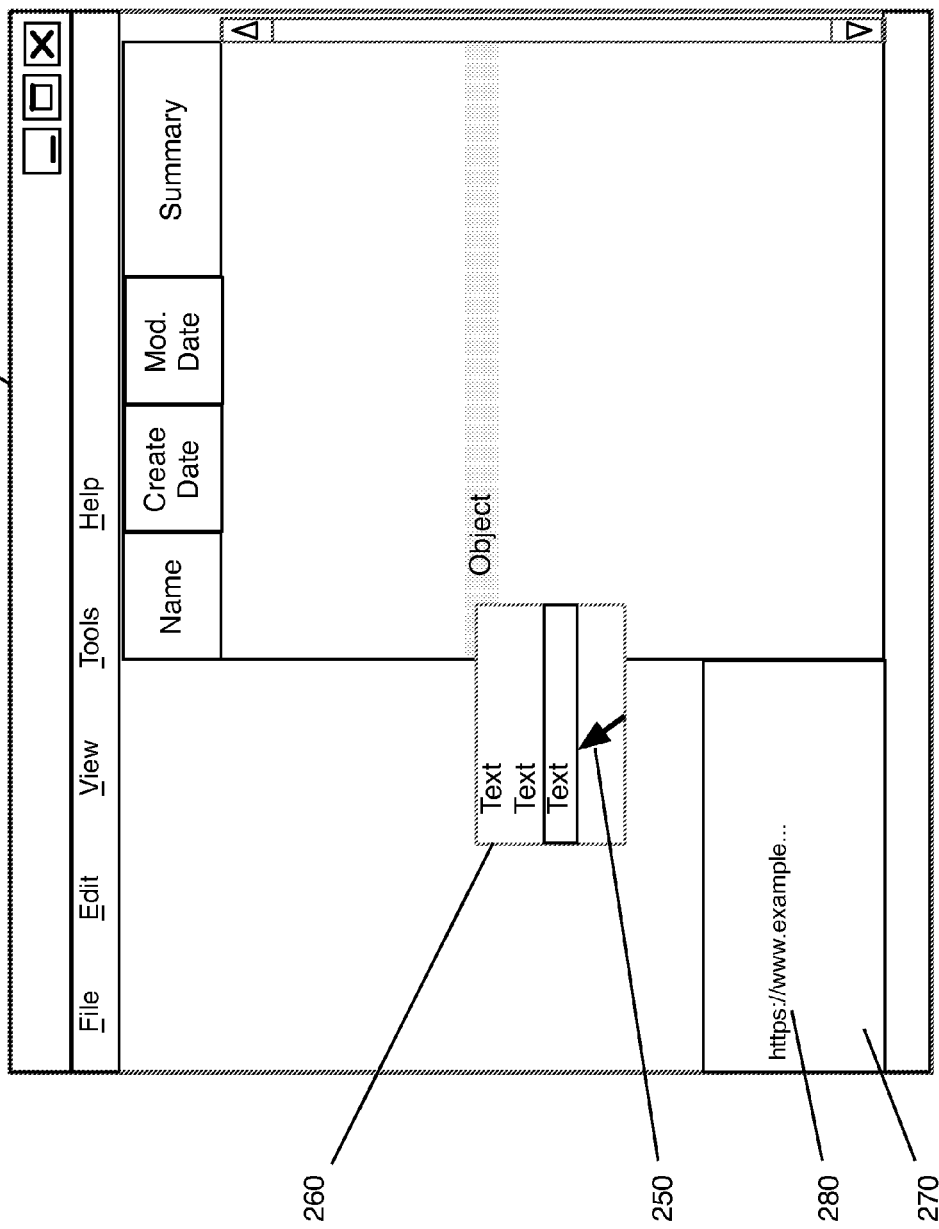

FIG. 2 shows the addition of a waypoint to an earlier-created path. Using a mouse pointer 250 or any other selection device, a contextual menu 260 may be accessed, the contextual menu 260 including a command to add a selected data view as a waypoint. For example, once a waypoint for the current data view is added, waypoint field 270 includes a URL 280 for the newly-added waypoint.

It should be noted that while waypoint fields 170 and 270 are shown in FIGS. 1 and 2 as including URLs, this is not essential. A user may choose to add descriptive material describing the data view, which may then be shown in a waypoint field rather than the underlying URL of the waypoint or path.

The sequence in which waypoints are added to a path is implicit in the creation of the path and waypoints. As such, a user's navigation through an information space may be "replayed" such that other users (or the original user) may view, in sequence, the precise data views originally presented to the user.

Figure 3:
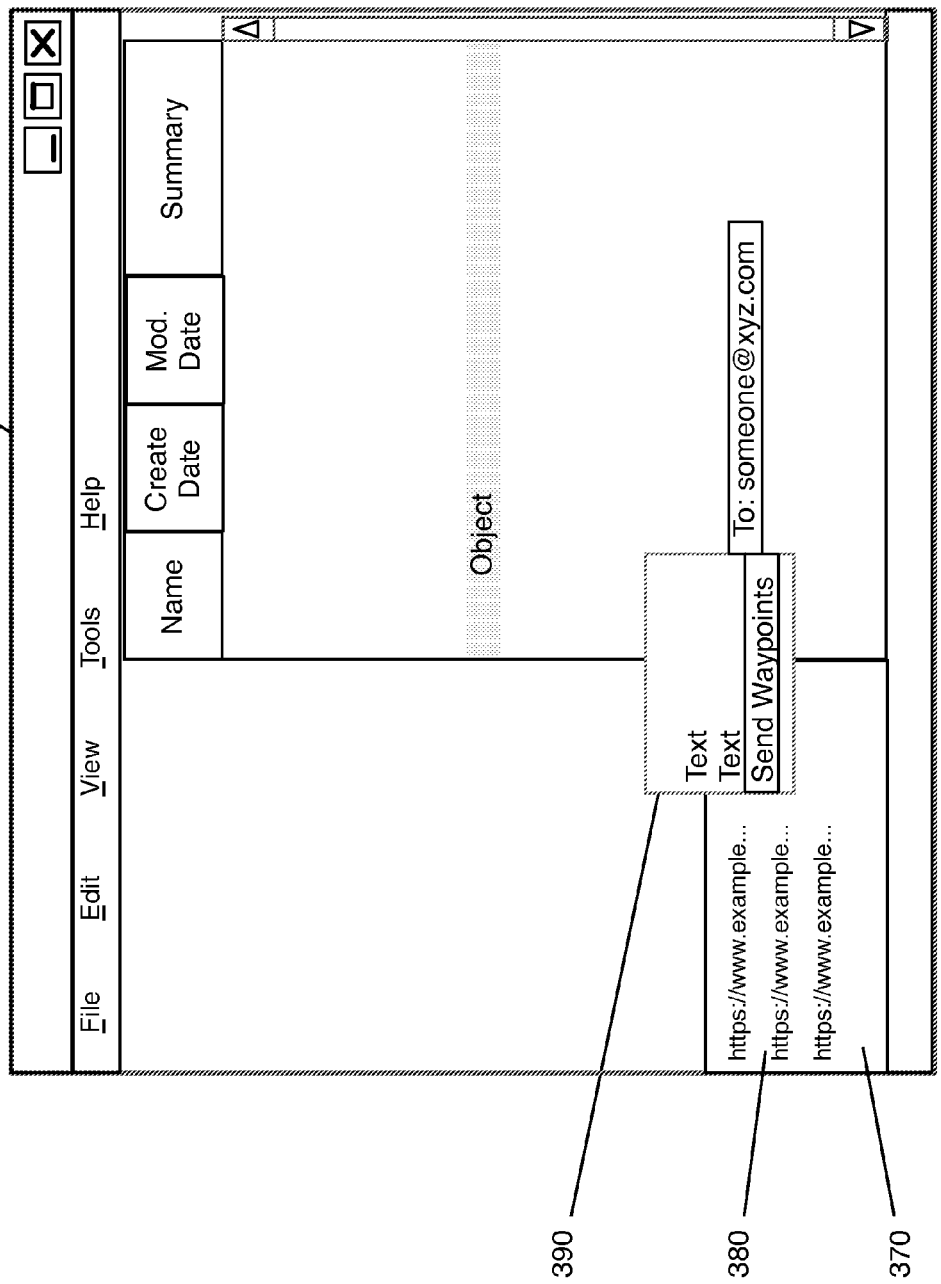

Sharing individual waypoints or the path as a whole may be accomplished by transferring (e.g., via email) the URLs of individual waypoints and/or the path URL to another user, who may then recreate the dataviews by opening the URL(s) in a Web browser. For example, FIG. 3 shows GUI 300 as waypoint 380 is selected, revealing a contextual menu 390 including a command for sending the selected waypoint via a user's email program.

Figure 4:
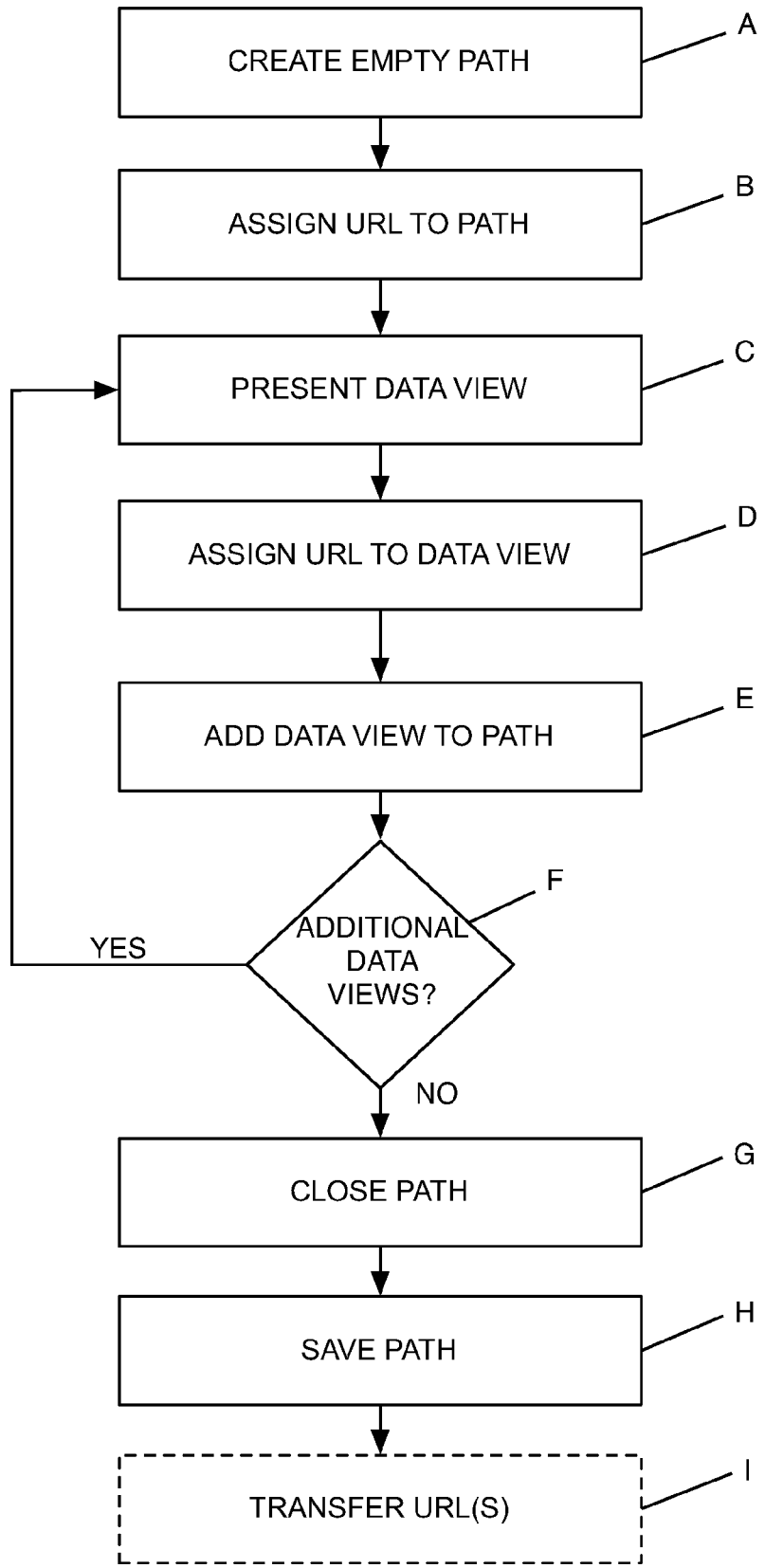
FIG. 4 shows a flow diagram of an illustrative method according to an embodiment of the invention.

FIG. 4 shows a flow diagram of an illustrative method of preserving data views according to an aspect of the invention. At A, an empty path is created, to which individual waypoints will be added. At B, a URL is assigned to the path created at A. At C, a data view of an information space is presented to a user (e.g., via a Web browser). At D, a URL is assigned to the data view, thereby establishing a waypoint. At E, the data view is added to the path created at A.

At F, it is determined whether additional data views are to be presented and/or added to the path. If so (i.e., "YES" at F), C through E may be iteratively looped until no additional data views are to be presented and/or added to the path (i.e., "NO" at F).

At G and H, the path is closed and saved, respectively. At I, one or more of the URLs assigned at steps B, D, and G may be transferred (e.g., via email) to another user.

Figure 5:
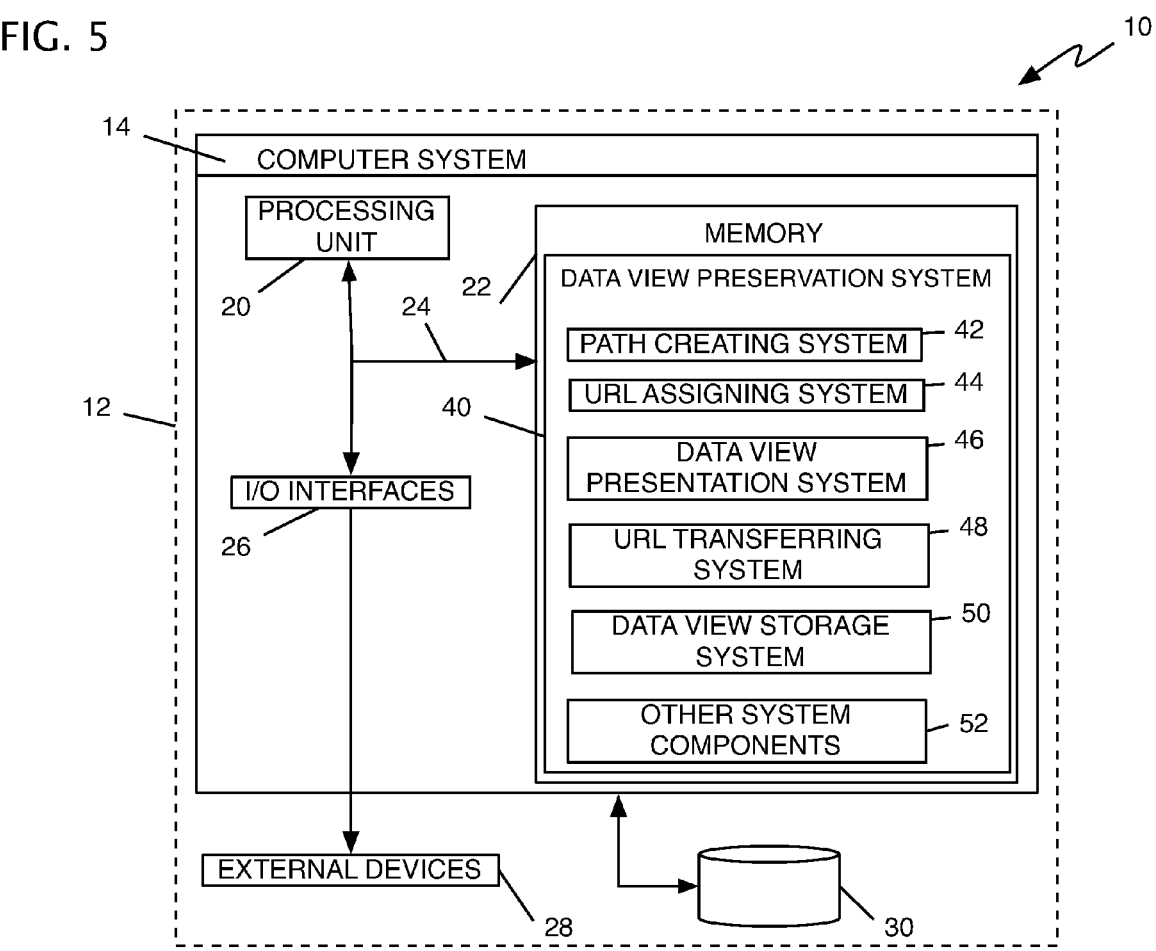
FIG. 5 shows a block diagram of an illustrative system according to an embodiment of the invention.

FIG. 5 shows an illustrative system 10 for preserving data views. To this extent, system 10 includes a computer infrastructure 12 that can perform the various process steps described herein for preserving data views. In particular, computer infrastructure 12 is shown including a computer system 14 that comprises a data view preservation system 40, which enables computer system 14 to facilitate the preservation of data views by performing the process steps of the invention.

Computer system 14 is shown including a processing unit 20, a memory 22, input/output (I/O) interfaces 26, and a bus 24. Further, computer system 14 is shown in communication with external devices 28 and a storage system 30. As is known in the art, in general, processing unit 20 executes computer program code, such as collaborative editing system 40, that is stored in memory 22 and/or storage system 30. While executing computer program code, processing unit 20 can read and/or write data from/to memory 22, storage system 30, and/or I/O interface 26. Bus 24 provides a communication link between each of the components in computer system 14. External devices 28 can comprise any device that enables a user (not shown) to interact with computer system 14 or any device that enables computer system 14 to communicate with one or more other computer systems.

In any event, computer system 14 can comprise any general purpose computing article of manufacture capable of executing computer program code installed by a user (e.g., a personal computer, server, handheld device, etc.). However, it is understood that computer system 14 and collaborative editing system 40 are only representative of various possible computer systems that may perform the various process steps of the invention. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, data view preservation system 40 enables computer system 14 to preserve data views. To this extent, data view preservation system 40 is shown including a path creating system 42, a URL assigning system 44, a data view presentation system 46, a URL transferring system 48, and a data view storage system 50. Operation of each of these systems is discussed above. Data view preservation system 40 may further include other system components 52 to provide additional or improved functionality to data view preservation system 40. It is understood that some of the various systems shown in FIG. 7 can be implemented independently, combined, and/or stored in memory for one or more separate computer systems 14 that communicate over a network. Further, it is understood that some of the systems and/or functionality may not be implemented, or additional systems and/or functionality may be included as part of system 10.

While shown and described herein as a method and system for preserving data views, it is understood that the invention further provides various alternative embodiments. For example, in one embodiment, the invention provides a computer-readable medium that includes computer program code to enable a computer infrastructure to facilitate the preservation of data views. To this extent, the computer-readable medium includes program code, such as data view preservation system 40, that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), and/or on one or more data storage portions of a computer system, such as memory 22 and/or storage system 30 (e.g., a fixed disk, a read-only memory, a random access memory, a cache memory, etc.).

In another embodiment, the invention provides a business method that performs the process steps of the invention on a subscription, advertising, and/or fee basis. That is, a service provider could offer to preserve data views as described above. In this case, the service provider can create, maintain, support, etc., a computer infrastructure, such as computer infrastructure 12, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for preserving data views. In this case, a computer infrastructure, such as computer infrastructure 12, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as computer system 14, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of preserving data views encountered as a user browses an information space, the method comprising:
   creating a path to be taken by a user through an information space;
   creating a uniform resource locator (URL) for the path;
   presenting a first data view of the information space using a computing device;
   assigning a URL to the first data view;
   adding the first data view to the path;
   presenting a second data view of the information space using the computing device;
   assigning a URL to the second data view; and
   adding the second data view to the path relative to the first data view,
   wherein at least one of the first data view or the second data view includes: a query and a query result set, and further includes at least one component selected from a group consisting of: a query parameter, a database connection parameter, and a view parameter.

2. The method of claim 1, further comprising:
   permitting a user to provide a description of the first data view; and
   storing the description.

3. The method of claim 1, further comprising:
   transferring the URL of the path.

4. The method of claim 1, further comprising:
   refreshing the first data view to display a current data view.

5. The method of claim 1, wherein at least one of the first data view and the second data view includes a timestamp.

6. The method of claim 1, wherein the information space includes a website.

7. A system for preserving data views encountered as a user browses an information space, the system comprising:
   a system for creating a path to be taken by a user through an information space
   a system for creating a uniform resource locator (URL) for the path;
   a system, including a computing device, for presenting a first data view of the information space;
   a system for assigning a URL to the first data view;
   a system for adding the first data view to the path;
   a system for presenting a second data view of the information space using the computing device;
   a system for assigning a URL to the second data view; and
   a system for adding the second data view to the path relative to the first data view,
   wherein at least one of the first data view or the second data view includes: a query and a query result set, and further includes at least one component selected from a group consisting of: a query parameter, a database connection parameter, and a view parameter.

8. The system of claim 7, further comprising:
   a system for permitting a user to provide a description of the first data view; and
   a system for storing the description.

9. The system of claim 7, further comprising:
   a system for transferring the URL of the path.

10. The system of claim 7, further comprising:
    a system for refreshing the first data view to display a current data view.

11. The system of claim 7, wherein at least one of the first data view and the second data view includes a timestamp.

12. The system of claim 7, wherein the information space includes a website.

13. A program product stored on a computer-readable storage medium, which when executed, preserves data views encountered as a user browses an information space, the program product comprising:
    program code for creating a path to be taken by a user through an information space;
    program code for creating a uniform resource locator (URL) for the path;
    program code for presenting a first data view of the information space;
    program code for assigning a URL to the first data view;
    program code for adding the first data view to the path;
    program code for presenting a second data view of the information space using the computing device;
    program code for assigning a URL to the second data view; and program code for adding the second data view to the path relative to the first data view, wherein at least one of the first data view or the second data view includes: a query and a query result set, and further includes at least one component selected from a group consisting of: a query parameter, a database connection parameter, and a view parameter.

14. The program product of claim 13, further comprising:

program code for permitting a user to provide a description of the first data view;

program code for storing the description;

program code for transferring the URL of the path; and program code for refreshing the first data view to display a current data view.

15. A method for deploying an application for preserving data views encountered as a user browses an information space, comprising:

providing a computer infrastructure being operable to:

create an empty path to be taken by a user through an information space;

create a uniform resource locator (URL) for the path;

present a first data view of the information space, using a computing device;

assign a URL to the first data view;

add the first data view to the path;

present a second data view of the information space using the computing device;

assign a URL to the second data view; and add the second data view to the path relative to the first data view.

16. The method of claim 15, wherein the computer infrastructure is further operable to:

permit a user to provide a description of the first data view;

store the description of the first data view;

permit a user to provide a description of the path; and store the description of the path.

* * * * *